(12) United States Patent
Clem et al.

(10) Patent No.: US 8,061,592 B1
(45) Date of Patent: Nov. 22, 2011

(54) OVERDRAFT THRESHOLD ANALYSIS AND DECISIONING

(75) Inventors: Andrew L. Clem, Sewickley, PA (US); Joseph A. Eberhardt, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 12/614,747

(22) Filed: Nov. 9, 2009

(51) Int. Cl.
*G06Q 40/00* (2006.01)
(52) U.S. Cl. ............ 235/379; 235/375; 235/380
(58) Field of Classification Search .......... 235/375, 235/379, 380; 705/5, 35–45
See application file for complete search history.

(56) References Cited

U.S. PATENT DOCUMENTS

| | | | |
|---|---|---|---|
| 6,834,271 B1 | 12/2004 | Hodgson et al. | |
| 7,617,156 B1 * | 11/2009 | Wolfson | 705/42 |
| 2006/0265335 A1 | 11/2006 | Hogan et al. | |
| 2007/0100745 A1 * | 5/2007 | Keiser et al. | 705/38 |
| 2007/0219900 A1 * | 9/2007 | MacGuire | 705/38 |
| 2008/0021813 A1 * | 1/2008 | Simpson et al. | 705/38 |
| 2008/0103967 A1 * | 5/2008 | Ackert et al. | 705/39 |
| 2010/0153247 A1 * | 6/2010 | DiPaolo et al. | 705/34 |

OTHER PUBLICATIONS

U.S. Appl. No. 12/614,716, filed Nov. 9, 2009.

* cited by examiner

*Primary Examiner* — Daniel Hess
*Assistant Examiner* — Matthew Mikels
(74) *Attorney, Agent, or Firm* — Robert J. Pugh; K&L Gates LLP

(57) ABSTRACT

Systems and methods of providing for processing a banking transaction, such as a debit card transaction, with an overdraft threshold. If a transaction drives an associated account to a negative balance, the amount of the transaction may be compared to an overdraft threshold. If the amount of the transaction does not exceed the overdraft threshold, an overdraft fee may be waived.

19 Claims, 5 Drawing Sheets

OVERDRAFT THRESHOLD ANALYSIS AND DECISIONING

FIELD OF THE INVENTION

The present disclosure generally relates to systems and methods for analyzing financial debit card-based transactions that overdraw an associated bank account, more particularly relates to analyzing the transactions to determine if a penalty, such as a fee, should be charged to the account holder.

BACKGROUND

A typical debit card holder may make a purchase at a point of sale using the debit card to access funds in the card holder's account at a financial institution. The point of sale may be at any type of location, such as a merchant's physical location, via telephone, via electronic media, or an online environment, for example. When the sale is made funds are typically transferred from the card holder's account, such as a checking account, to the merchant's account. Since the funds are drawn directly from the card holder's account, as opposed to a line of credit, it is possible that the amount of the sale may exceed the amount of funds in the card holder's account. In such non-sufficient funds ("NSF") circumstances, the debit card issuer may provide the debit card holder with "overdraft protection." Through overdraft protection, the sale may be completed at the point of sale even though the sale will drive the card holder's account to a negative balance, or an "overdrawn" condition. The debit card issuer, such as a financial institution, may charge a fee or other penalty to the account holder when the account becomes overdrawn. Such penalties may decrease customer satisfaction levels, such as when a penalty is charged when the amount of sale is relatively small.

In view of the foregoing issues, a need exists for systems and methods for a financial institution to address overdrawn accounts while maintaining acceptable customer satisfaction levels.

BRIEF DESCRIPTION OF THE FIGURES

The utility of the embodiments of the invention will be readily appreciated and understood from consideration of the following description of the embodiments of the invention when viewed in connection with the accompanying drawings.

DESCRIPTION

Figure 1:
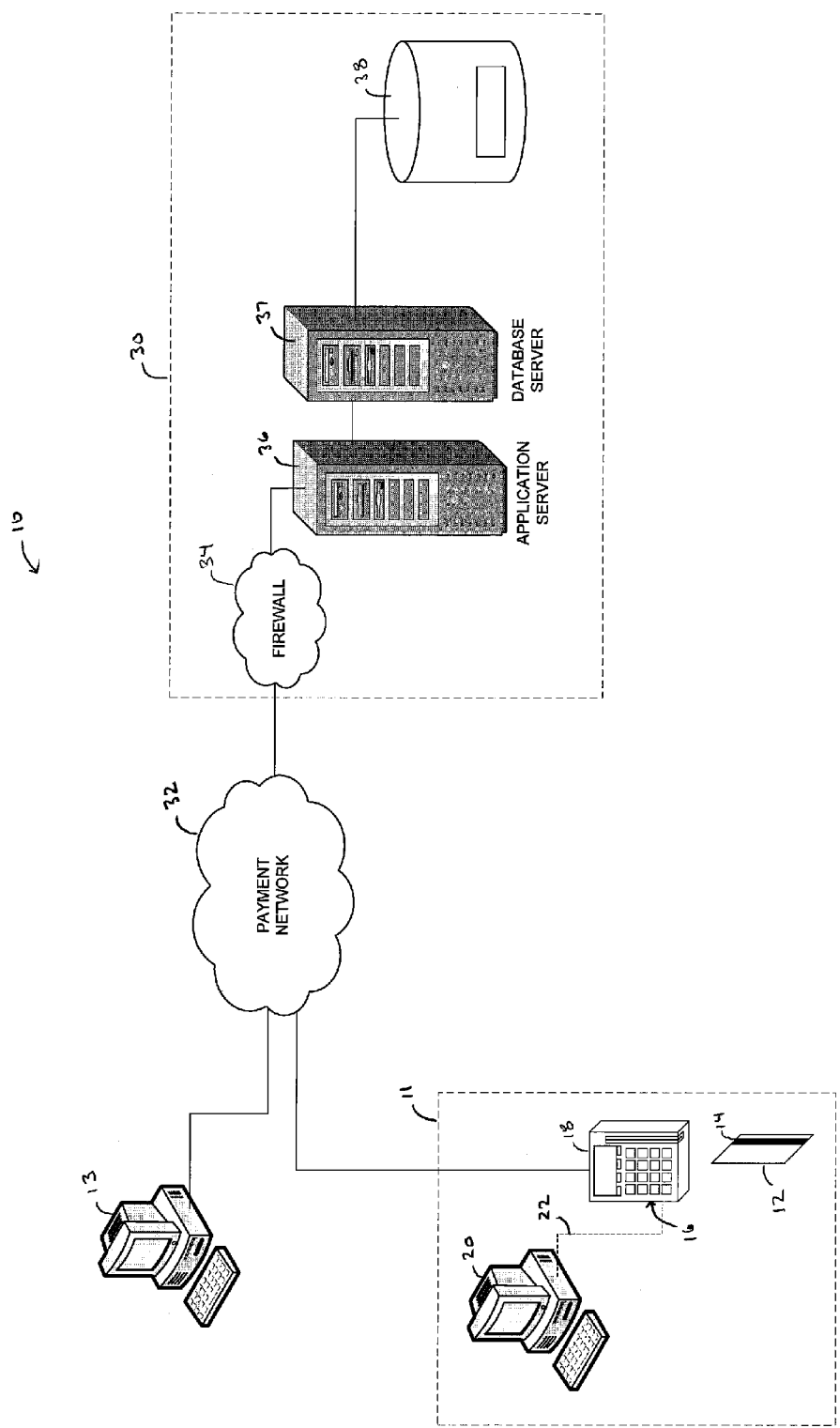
FIG. 1 is a system diagram in accordance with various embodiments.

Embodiments of the invention provide processes, methods, tools, strategies, techniques for analyzing financial transactions, such as debit card transactions, to determine if the account holder should not penalized even though an associated account does not have sufficient funds to satisfy the transaction.

Debit cards are issued to a holder for use during payment transactions. In various embodiments, the debit card is tied to the holder's bank account, such as a checking account. When the debit card is used by the holder to make a payment transaction to a merchant, for example, funds are transferred from the holder's account to the merchant's account. As may be appreciated, the funds may be transferred through a variety of intermediate service providers or systems. In some circumstances, the amount of payment transferred to the merchant exceeds the amount of funds available in the holder's checking account. Overdraft protection may be extended to the debit card holder in order to complete the transaction. As may be understood by those skilled in the art, such transfer creates an "overdrawn condition" with regard to the holder's bank account. In various embodiments, the amount of the payment or other various metrics can be analyzed to determine if a fee, or other type of penalty, is charged to the holder if the account when an overdrawn condition is created. In some implementations, if the amount of the payment does not exceed a threshold fund amount, a penalty will not be charged to the debit card holder. In various embodiments, the threshold fund amount may be in the range of $1.00 to $15.00, such as $10.00. In such embodiments, if the payment amount that creates the overdrawn condition is less than $10.00, a penalty will not be assessed against the debit card holder. Conversely, if the payment amount that creates the overdrawn condition exceeds the threshold fund amount, a fee may be charged to the debit card holder. The threshold fund amount may be selected based on a number on considerations, such as customer satisfaction, and cost associated with customer service functions. For example, if a standard fee is charged an overdrawn condition, even if the purchase is relatively small, the account holder may contact customer service to issue a complaint. There is a financial toll associated with that contact in terms of customer service resources. Therefore, in certain circumstance, if a fee is not assessed when the account is overdrawn, it is likely the account holder will not initiate a call with customer service. In various embodiments, the threshold fund amount can be determined based on a financial analysis of customer service issues.

In various embodiments, the amount available in the account may be determined using various metrics. For example, the amount available might be an average of the balance over a time period, or a maximum or minimum balance over a time period. In various embodiments, the amount available might be established based on a average balance over the 24-hour time period before the transaction, the 24-hour time period after the transaction, or a combination of both time periods. As may be appreciated, a variety of time periods may be used. In other examples, the amount available in the account is determined at the time of purchase. In various embodiments, the threshold fund amount may vary depending on different variables, such as the amount of funds in the account, the number of overdrawn conditions created in a time period, a credit score, card usage, the number of accounts, or other variables. For example, the overdraft threshold fund amount may decrease or increase over time, as the variables change.

In various embodiments, the penalty assessed due to overdrawn conditions is variable. For example, as previously discussed, the penalty may be waived if the payment amount does not exceed the threshold fund amount. In some embodiments, the penalty may be variable based on factors, such as the number of overdrawn conditions in a time period. For example, a first fee amount may be assessed if the payment amount does not exceed the threshold fund amount, and a second fee amount may be assessed if the payment amount exceeds the threshold fund amount. The second fee amount may be greater than the first fee amount. In various embodiments, the first fee may be in a range of $0.00 to $30.00 and the second fee may be greater than $30.00. The first fee amount and the second fee amount may increase or decrease based on any suitable factors, such as the number of overdrawn conditions in a time period.

FIG. 1 shows a system 10, which is configured to allow a consumer to make a purchase using a debit card 12 at a merchant location 11. The merchant location 11 may be any suitable location, such as an online environment or a physical merchant environment. The debit card 12 may have a computer-readable identifier 14, such as a magnetic stripe or a radio frequency identification (RFID) device, for example. The debit card 12 may be read by any suitable device, such as reader 18. The reader 18 may, for example, scan the computer-readable identifier 14 to obtain account information. Other techniques may be used to transfer card information to the merchant. For example, a card holder may verbally relay information over a telephone connection or manually type card information into a web-based interface via a computer 13. As may be appreciated, various security techniques also may be implemented, such as use of a Personal Identification Number (PIN) or the requirement of a signature. In one embodiment, the holder of the debit card 12 may have to enter a PIN using a keypad 16 on the reader 18 during the transaction. The reader 18 may be electrically coupled to a terminal 20 via a connection 22. It is appreciated that in various embodiments, the reader 18 may be unitary with the terminal 20.

The reader 18 may communicate with a financial institution 30 using any suitable technique, such as with a payment network 32, as illustrated. As may be appreciated, the payment network 32 may include a plurality of various network switches, servers, and/or other components. Also, the financial institution 30 may use various network security devices, such as a firewall 34. As may be appreciated by those skilled in the art, the financial institution 30 may comprise a multitude of processing systems and components, such as application server 36 and database server 37. Database server 37 may be in communication with a database 38. The application server 36 and the database server 37 may each comprise a processor for executing instructions stored in a computer readable medium. As may be appreciated by those skilled in the art, the financial institution 30 may also include a variety of other network devices, hosts, mainframes, servers, databases and/or other components. An account 40, such as a checking account, associated with the debit card 12 may be stored in the database 40. Purchases made with the debit card 12, such as at the merchant location 11, may access funds in the account 40. Accordingly, funds in the account 40 may be transferred from the account 40 to an account (not shown) of the merchant.

Figures 2A, 2B:
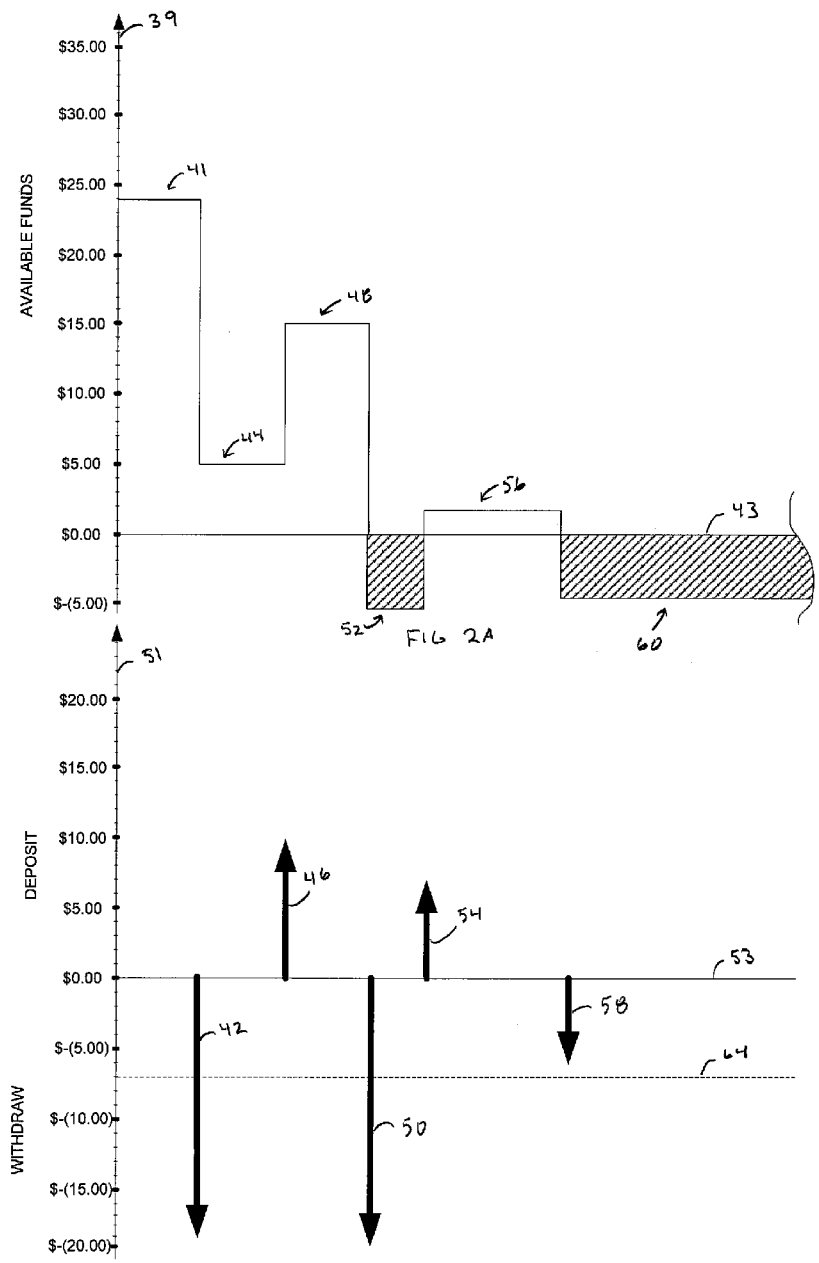
FIG. 2A is a graph of an example account balance over time in accordance with various embodiments.
FIG. 2B is a graph of example deposits and withdrawals associated with the account of FIG. 2A.

As shown in FIG. 2A the funds available in the account 40 (FIG. 1), shown on the vertical axis 39, may vary over time, shown on the horizontal axis 43. The account 40, such as a checking account, may be tied to a debit card. As shown in FIG. 2B, various transactions affect the funds available in the account. Positive transactions on the vertical axis 51 are shown as deposits, while negative transactions on the vertical axis are shown as withdrawals. Time is shown on the horizontal axis 53.

In the illustrated example, a first account balance 41 starts at $24.00. A debit card withdrawal 42 for $19.00 reduces the available funds to a second account balance 44 of $5.00. A deposit 46 of $10.00 increases the available funds to third account balance 48 of $15.00. A debit card withdraw 50 of $20.00 decreases the available funds to fourth account balance 52 of ($5.00), which is a negative balance. A deposit 54 of $7.00 increases the available funds to fifth account balance 56 of $2.00. A debit card withdrawal 58 of $6.00 decreases the available funds to sixth account balance 60 of ($4.00), which is a negative balance. It is noted that the debit card withdrawals may be purchases made with the debit card or other forms of withdrawals, such as withdrawals of funds at an automated teller machine (ATM).

Figure 5:
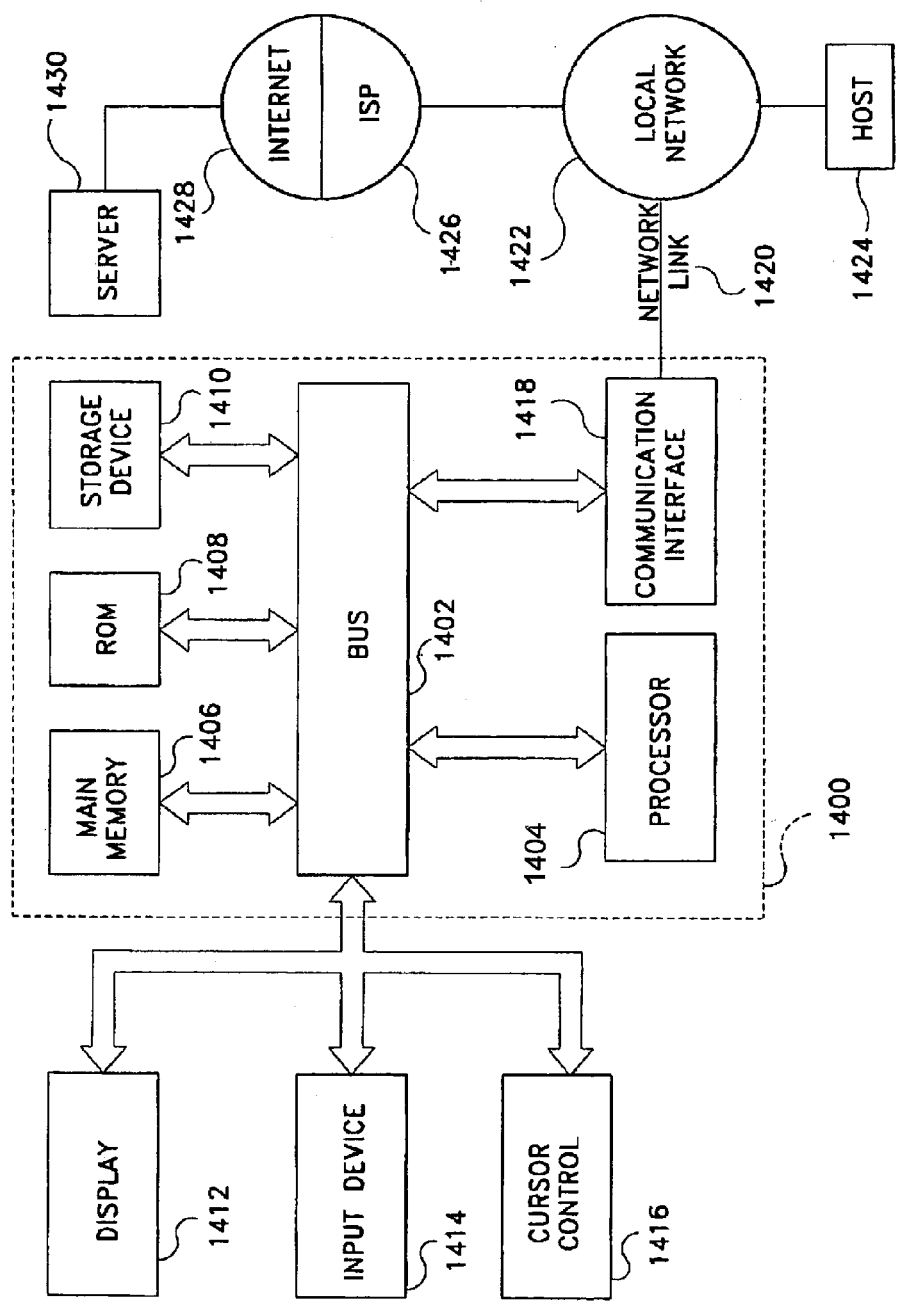
FIG. 5 is a block diagram of an example system in accordance with various embodiments.

As illustrated in FIG. 2A, the balance of the account 40 is negative at the fourth account balance 52 and the sixth account balance 60. In order to determine if an overdraft fee or other penalty should be incurred by the account holder, according to various embodiments, the particular withdrawal that created the negative account condition may be analyzed. In one embodiment, the amount of the withdrawal is analyzed by a transaction analysis system 1400 (FIG. 5). If the amount of the withdrawal that drove the account balance to a negative amount exceeds a threshold fund amount, an overdraft fee or other penalty may be incurred by the account holder. If, however, the amount of the withdrawal that drove the account balance to a negative amount does not exceed the threshold fund amount, an overdraft fee or other penalty may not be incurred by the account holder. Therefore, certain types of withdrawals using the debit card, even though taking the account to a negative balance, will not cause the account holder to be penalized.

A financial institution may use a variety of threshold fund amounts. For example, a single threshold fund amount may be established for every account held by the financial institution, or the threshold may vary for individual accounts or different types of accounts. The threshold fund amount may be selected from any suitable range, such as $1.00 to $20.00. In example illustrated in FIG. 2B, a threshold fund amount 64 is set at $7.00. The debit card withdrawal 50 of $20.00 exceeds the threshold fund amount 64 while the debit card withdrawal 58 of $6.00 does not exceed the threshold fund amount 64. Therefore, in this embodiment, the account holder would incur a penalty, such as an overdraft fee, for the $20.00 debit card withdrawal 50 and would not incur a penalty for the $6.00 debit card withdrawal 68. Further, the present disclosure is applicable to a variety of accounts and is not limited to checking accounts or individual accounts. For example, the present embodiments may be used in connection with money market accounts, commercial accounts, savings accounts, or investments accounts, for example.

Figure 3:
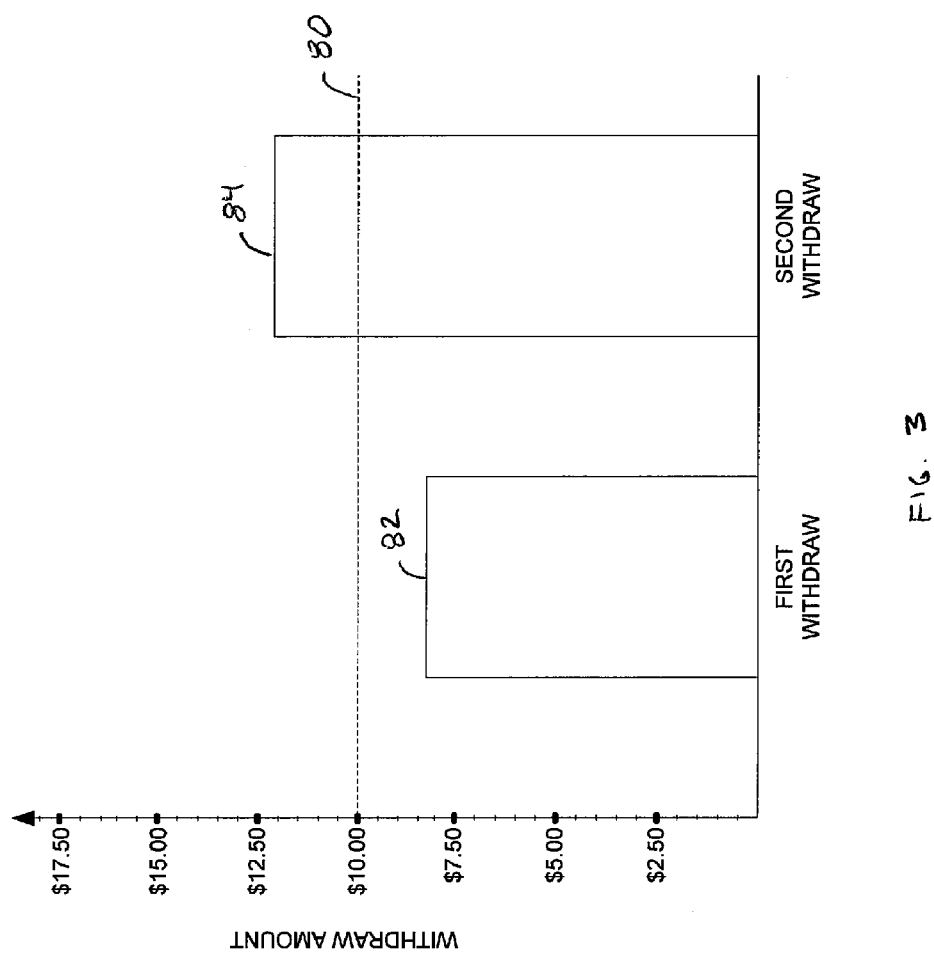
FIG. 3 is a graph of example withdrawals and a threshold fund amount in accordance with various embodiments.

FIG. 3 illustrates an example threshold fund amount 80 of $10.00. It is appreciated that other threshold fund amounts may be used, such as $5.00 or $12.50, for example. A first withdrawal 82 for $8.00 and a second withdrawal 84 for $12.00 is illustrated. The first withdrawal 82 and the second withdrawal 84 may be a PIN type transaction or a signature type transaction, for example. In various embodiments, if the first withdrawal 82 drives the account balance negative, a penalty would not be incurred by the account holder since the transaction amount does not exceed the threshold fund amount 80. Conversely, if the second withdrawal 84 drives the account balance negative, a penalty would be incurred. As may be appreciated, the penalty may be any suitable penalty, such as a fee.

In various embodiments, a series of withdrawal transactions that are all below the threshold fund amount 80 may not incur a penalty even though the series of transactions continues to drive the associated account further negative. It is appreciated, however, that a financial institution may reduce the threshold fund amount 80, or otherwise remove the threshold fund amount 80, in certain situations. For example, if it is suspected that a card holder is abusing the privilege, the threshold fund amount 80 associated with that card holder's account may be altered.

Figure 4:
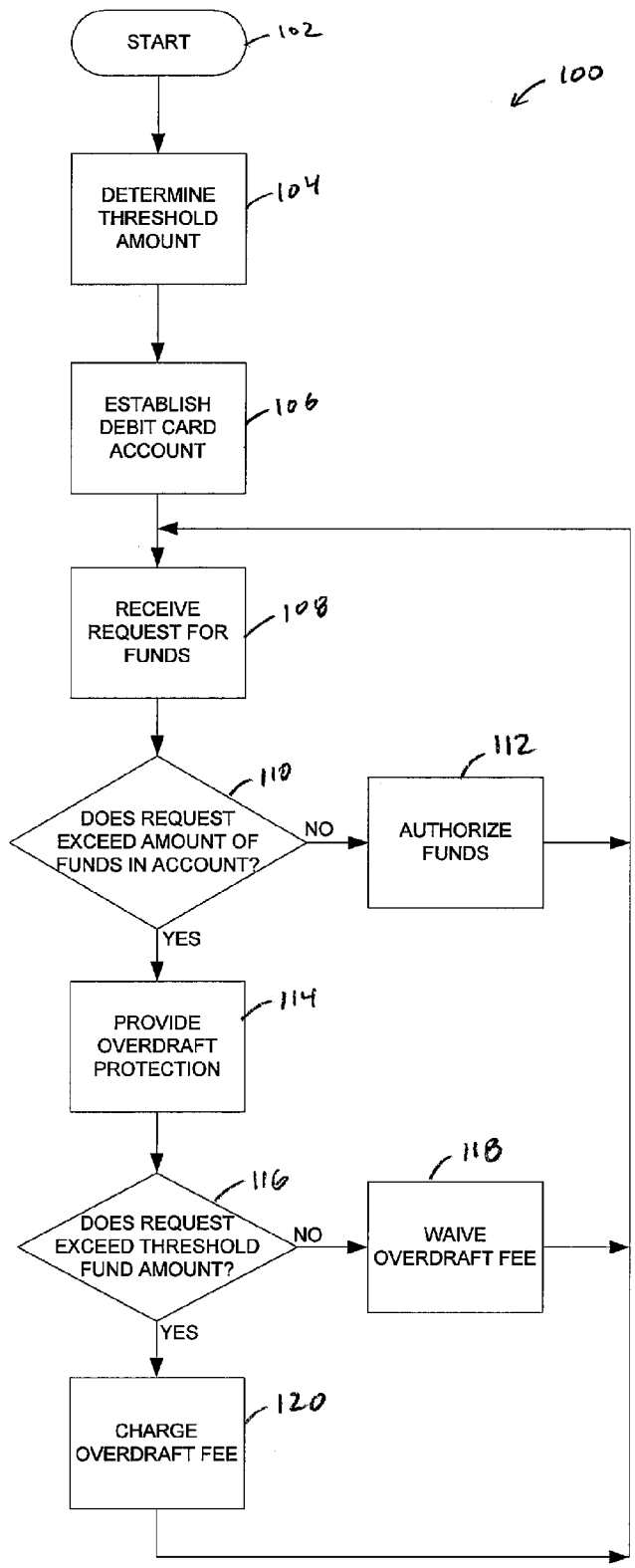
FIG. 4 is an example process in accordance with various embodiments.

FIG. 4 is a flowchart of an example process 100, according to one embodiment. The process starts at 102. At 104, the threshold fund amount may be determined. The threshold fund amount may be, for example, set to $4.50. At 106, a debit card account is established. The debit card account may contain funds of the card holder that are accessible through use of the debit card. At 108, a request for funds is received. This request may come from any type of transaction, such as an online transaction or a transaction at a "brick and mortar" merchant, for example. Further, the transaction may be a PIN transaction or a signature transaction, or any other suitable from of transaction. At 110, the amount of requested funds is compared to the amount of funds in the account. This comparison may be automated and performed by a transaction analysis system 1400 (FIG. 5). The transaction analysis system may be part of the application server 36 and/or web server 37 (FIG. 1), or it may be a separate device, or incorporated into another component, or plurality of components. As may be appreciated, a large number of requests from may be received simultaneously from a larger number of debit card holders and the transaction analysis system may be configured to handle the requests. If the amount requested does not exceed the account balance, there are sufficient funds to complete the transaction and the funds may be authorized at 112. If the amount requested for the transaction does exceed the account balance, overdraft protection may be provided to the account holder at 114. At 116, the request amount may be compared to the threshold fund amount. If the request amount does not exceed the threshold fund amount, the overdraft fee may be waived at 118. If the request amount does exceed the threshold fund amount, than the account holder may be charged an overdraft fee at 120.

FIG. 5 is a block diagram illustrating an embodiment of an transaction analysis system 1400 upon which various embodiments may be implemented. In various embodiments the transaction analysis system may comprise a computer or computer system. The transaction analysis system 1400 may include a bus 1402 or other communication mechanism for communicating information, and a processor 1404 coupled with the bus 1402 for processing information. The transaction analysis system 1400 also may include a main memory 1406, such as a random access memory (RAM) or other dynamic storage device; coupled to the bus 1402 for storing information and instructions to be executed by the processor 1404. The main memory 1406 also may be used for storing temporary variables or other intermediate information during execution of instructions to be executed by the processor 1404. The transaction analysis system 1400 further may include a read only memory (ROM) 1408 or other static storage device coupled to the bus 1402 for storing static information and instructions for the processor 1404. A storage device 1410, such as a magnetic disk or optical disk, is may be provided and coupled to the bus 1402 for storing information and instructions.

The transaction analysis system 1400 may be coupled via the bus 1402 to a display 1412, such as a cathode ray tube (CRT) or a flat panel display, for displaying information to a computer user. An input device 1414, including alphanumeric and other keys, may be coupled to the bus 1402 for communicating information and command selections to the processor 1404. Another type of user input device is cursor control 1416, such as a mouse, a trackball, or cursor direction keys for communicating direction information and command selections to the processor 1404 and for controlling cursor movement on the display 1412.

According to one embodiment, the comparing of a requested fund amount to an account balance and a threshold fund amount is performed by the transaction analysis system 1400 in response to the processor 1404 executing sequences of instructions contained in the main memory 1406. Such instructions may be read into the main memory 1406 from another computer-readable medium, such as storage device the 1410. However, the computer-readable medium is not limited to devices such as the storage device 1410. For example, the computer-readable medium may include a floppy disk, a flexible disk, hard disk, magnetic tape, or any other magnetic medium, a CD-ROM, any other optical medium, a RAM, a PROM, an EPROM, a FLASH-EPROM, any other memory chip or cartridge, or any other medium from which a computer can read. Execution of the sequences of instructions contained in the main memory 1406 may cause the processor 1404 to perform the process 100 (FIG. 4). The embodiments are not limited to any specific combination of hardware circuitry and software.

The transaction analysis system 1400 also may include communication interface 1418 coupled to the bus 1402. The communication interface 1418 provides two-way data communication. For example, the communication interface 1418 may be an integrated services digital network (ISDN) card or a modem to provide a data communication connection to a corresponding type of telephone line. As another example, the communication interface 1418 may be a local area network (LAN) card to provide a data communication connection to a compatible LAN. Wireless links may also be implemented.

A network link 1420 typically provides data communication through one or more networks, such as the payment network 32 (FIG. 1), to other data devices. For example, the network link 1420 may provide a connection through local network 1422 to a host computer 1424 or to data equipment operated by an Internet Service Provider (ISP) 1426. The ISP 1426 in turn provides data communication services through the world wide packet data communication services through the world wide packet data communication network, commonly referred to as the "Internet" 1428.

The transaction analysis system 1400 may send messages and receive data, including program code, through the network(s), the network link 1420 and the communication interface 1418. In the Internet example, a server 1430 might transmit a requested code for an application program through the Internet 1428, the ISP 1426, the local network 1422, and the communication interface 1418. The received code may be executed by the processor 1404 as it is received, and/or stored in the storage device 1410, or other non-volatile storage for later execution.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components:

arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the transaction analysis system may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A system for processing a banking transaction, the system comprising:
    an electronic payment network;
    a database for storing an account;
    a processor; and
    a storage device in communication with the processor and storing instructions adapted to be executed by the processor to:
    receive a request for an amount of funds from the account for a debit card transaction via the payment network;
    determine if the requested fund amount exceeds an available fund amount in the account;
    determine if the requested fund amount for the debit card transaction is less than a threshold fund amount; and
    waive an overdraft fee when the requested fund amount is less than the threshold fund amount and the requested fund amount exceeds the available fund amount.

2. The system of claim 1, wherein the storage device stores instructions adapted to be executed by the processor to charge an overdraft fee when the requested fund amount for the debit card transaction exceeds the threshold fund amount and the requested fund amount exceeds the available fund amount.

3. The system of claim 1, wherein the threshold fund amount is selected from the range of $1.00 to $20.00.

4. The system of claim 1, wherein the threshold fund amount is variable.

5. The system of claim 1, wherein the available fund amount is determined by an average balance of the debit card account during a time period.

6. The system of claim 1, wherein the available fund amount is determined by one of a maximum and a minimum of a balance during a time period.

7. The system of claim 1, wherein a first threshold fund amount is associated with a first debit card account and a second threshold fund amount is associated with a second debit card account, and the first threshold fund amount is different from the second threshold fund amount.

8. A system for processing a banking transaction, the system comprising:
    an electronic payment network;
    a database for storing a debit card account;
    a processor; and
    a storage device in communication with the processor and storing instructions adapted to be executed by the processor to:
        receive a first request for an amount of funds from a first debit card account for a first debit card transaction;
        determine if the first requested fund amount exceeds an available fund amount in the first debit card account;
        determine if the first requested fund amount for the first debit card transaction is less than a first threshold fund amount;
        waive a first overdraft fee for the first debit card account when the requested fund amount is less than the first threshold fund amount and the first requested fund amount exceeds the available fund amount;
        receive a second request for an amount of funds from a second debit card account for a second debit card transaction;
        determine if the second requested fund amount exceeds an available fund amount in the second debit card account;
        determine if the second requested fund amount for the second debit card transaction is less than a second threshold fund amount;
        waive a second overdraft fee for the second debit card account when the requested fund amount is less than the second threshold fund amount and the second requested fund amount exceeds the available fund amount, and wherein the first threshold fund amount is different from the second threshold fund amount.

9. The system of claim 8, wherein the available fund amount in the first debit card account is determined by an average balance of the first debit card account during a time period.

10. The system of claim 8, wherein the available fund amount in the first debit card is determined by one of a maximum and a minimum of a balance during a time period.

11. The system of claim 8, wherein the first threshold fund amount is selected from the range of $1.00 to $20.00.

12. The system of claim 8, wherein the second threshold fund amount is selected from the range of $1.00 to $20.00.

13. The system of claim 8, wherein the first threshold fund amount and the second threshold fund amount are variable.

14. A system for processing a banking transaction, the system comprising:
   an electronic payment network;
   a database for storing a debit card account;
   a processor; and
   a storage device in communication with the processor and storing instructions adapted to be executed by the processor to:
   determine a threshold fund amount;
   establish in the database a debit card account for an account holder;
   receive a request for an amount of funds from the debit card account for a debit card transaction via a payment network;
   determine if the requested fund amount exceeds an available fund amount in the debit card account;
   determine if the requested fund amount for the debit card transaction is less than the threshold fund amount;
   assess a first overdraft fee against the account holder when the requested fund amount is less than the threshold fund amount and the requested fund amount exceeds the available fund amount; and
   assess a second overdraft fee for the account holder when the requested fund amount is greater than the threshold fund amount and the requested fund amount exceeds the available fund amount.

15. The system of claim 14, wherein the first overdraft fee is greater than the second overdraft fee.

16. The system of claim 14, wherein the first overdraft fee is variable.

17. The system of claim 14, wherein the second overdraft fee is variable.

18. The system of claim 14, wherein the first overdraft fee is less than $30.00.

19. A system for processing a banking transaction, the system comprising:
   means for receiving a request for an amount of funds from a debit card account for a debit card transaction;
   means for determining if the requested fund amount exceeds an available fund amount in the debit card account;
   means for providing overdraft protection to the debit card account if the requested fund amount exceeds the available fund amount;
   means for determining if the requested fund amount for the debit card transaction is less than a threshold fund amount; and
   means for waiving an overdraft fee for the account holder of the debit card account when the requested fund amount is less than the threshold fund amount and the requested fund amount exceeds the available fund amount.

* * * * *